United States Patent

[11] 3,619,562

| [72] | Inventor | James W. Jacobs |
| --- | --- | --- |
| | | Dayton, Ohio |
| [21] | Appl. No. | 004,948 |
| [22] | Filed | Jan. 22, 1970 |
| [45] | Patented | Nov. 9, 1971 |
| [73] | Assignee | General Motors Corporation |
| | | Detroit, Mich. |

[54] MOVABLE REFLECTOR INFRARED HEATER
3 Claims, 4 Drawing Figs.

[52] U.S. Cl. .................................................. 219/348,
219/202, 219/349
[51] Int. Cl. .................................................... H05b 1/00
[50] Field of Search ........................................... 219/202,
203, 347, 348, 349

[56] References Cited
UNITED STATES PATENTS

| 1,416,964 | 5/1922 | Moreton .................. | 219/349 |
| 1,686,865 | 10/1928 | Klotz ..................... | 219/349 |
| 1,754,669 | 4/1930 | Cohen .................... | 219/203 X |
| 1,852,599 | 4/1932 | Zaiger et al. ............. | 219/203 |
| 2,469,412 | 5/1949 | Roebken .................. | 219/349 UX |
| 3,313,915 | 4/1967 | Chamberlain ............. | 219/202 X |

FOREIGN PATENTS

| 220,922 | 3/1925 | Great Britain ............. | 219/349 |
| 571,924 | 9/1945 | Great Britain ............. | 219/347 |

*Primary Examiner*—R. F. Staubly
*Attorneys*—William S. Pettigrew and John C. Evans ABSTRACT: An infrared heater for warming the interior of an automobile having a stationary reflector which directs infrared radiation from a resistance wire element to pivotal reflecting surfaces adjacent and connected to the stationary reflector to redirect the infrared radiation into alternate portions of the automobile interior.

PATENTED NOV 9 1971 3,619,562

INVENTOR.
James W. Jacobs
BY
J. C. Evans
ATTORNEY

PATENTED NOV 9 1971

INVENTOR.
James W. Jacobs
BY
J.C. Evans
ATTORNEY 3,619,562

MOVABLE REFLECTOR INFRARED HEATER

This invention relates to an automobile heater and more particularly to an infrared-type heater.

The interior of a modern automobile is normally heated during cool weather by passing warm engine coolant through a heat exchanger. Although this system of heating the interior has been successful, it has one significant drawback. After the cold engine is first started and until it reaches its operating temperature, the coolant-warmed heat exchanger is inadequate to warm the automobile interior.

The present invention utilizes an infrared heat source to warm the automobile interior during the engine warmup period. After the temperature of engine coolant increases sufficiently to warm the interior, the infrared source is deactivated. The heat source is a resistance wire element positioned behind the automobile dashboard or other interior wall and surrounded by a reflector which directs infrared radiation toward an opening in the wall. A pivotal reflecting surface adjacent this opening can be provided to redirect the radiation into alternate portions of the automobile interior. The reflecting surface is selectively movable by a passenger to redirect the heat in a desired direction.

Therefore, an object of the invention is the provision of an infrared heater for warming the interior of an automobile having a stationary reflector to direct infrared radiation into the automobile interior.

A further object of the invention is the provision of an infrared heater for warming the interior of an automobile having a stationary reflector positioned positioned behind the dashboard of the automobile to direct infrared radiation toward a movable reflector for redirecting the radiation through an opening in the dashboard to alternate portions of the automobile interior.

Further objects and advantages of the present invention will be apparent from the following detailed description, reference being had to the accompanying drawings wherein preferred embodiments of the present invention are clearly shown.

IN THE DRAWINGS

Figure 1:
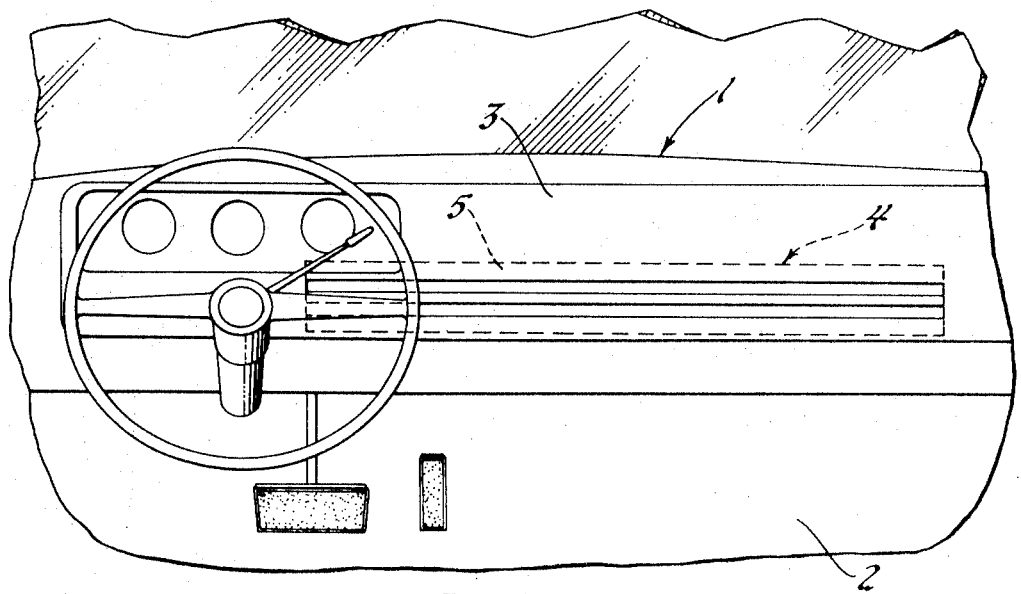
FIG. 1 is a fragmentary view of an automobile dashboard looking from the passenger compartment forward and showing an embodiment of an infrared heater.

In FIG. 1 of the drawings, a dashboard 1 within an interior 2 of an automobile is illustrated. Behind a front 3 of dashboard 1 is located an infrared heater 4. Heater 4 includes an elongated stationary reflector 5 which extends across the automobile in facing relation to passengers within interior 2.

Figure 2:
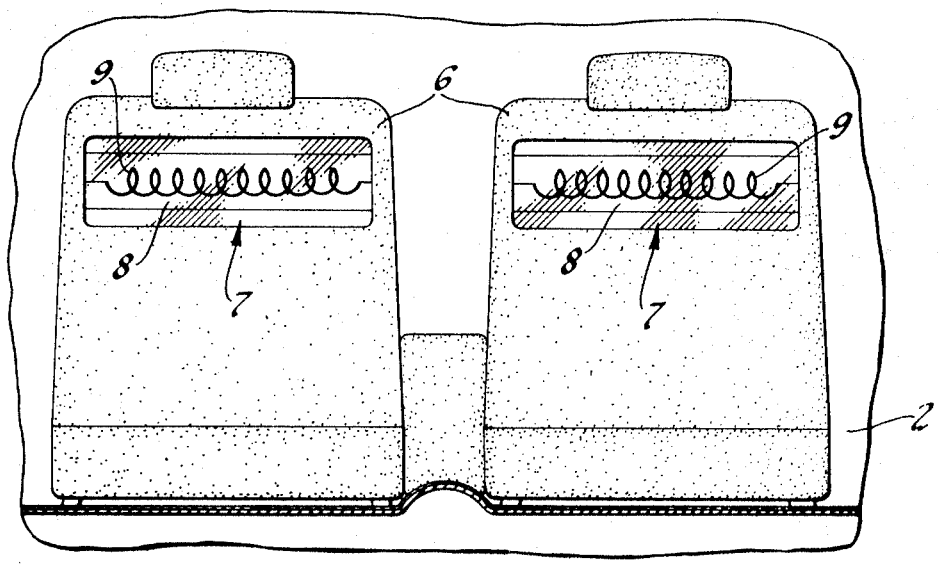
FIG. 2 is a fragmentary view of an automobile front seat back looking from the rear passenger compartment and showing an embodiment of an infrared heater.

In FIG. 2 of the drawings, seat backs 6 of the front seats are illustrated within an interior 2 of the automobile. Infrared heaters 7 which basically include curved reflectors 8 and resistance wire infrared heating elements 9 are recessed within the seat backs 6 in facing relation to passengers within the rear of interior 2.

Figure 3:
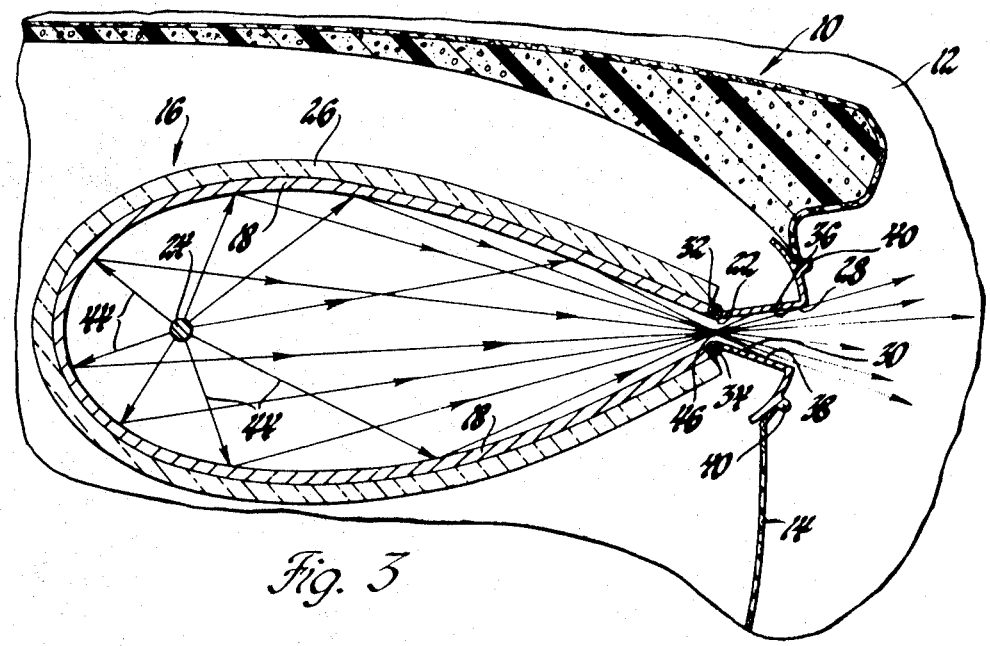
FIG. 3 is a side view in section of an automobile dashboard showing an embodiment of the present invention.

A specific embodiment of an infrared heater is illustrated in FIG. 3 which shows a dashboard 10 within an interior passenger compartment 12. Behind a front 14 of dashboard 10 is located an infrared heater 16. Heater 16 includes an elongated stationary reflector 18 which extends across the automobile in a direction normal to the plane of the drawing. Reflector 18 is curved around an electric resistance wire element 24 and forms a narrow opening 22 to the interior 12 of the automobile. The resistance wire element 24 is connected to the automobile battery by conductors through a heater switch (not shown). When current is passed through the resistance wire element 24, heat is generated within reflector 18 in the form of infrared radiation. A layer of insulation 26 on the outer surface of reflector 18 prevents the escape of heat except through opening 22.

The resistance element 24 is composed of a material which readily emits infrared radiation. Nickel-chromium alloys are suitable for the resistance element 24. When operated at temperatures below 1,800° F. these alloys have good hot-strength properties and desirable resistance to oxidation. Also, suitable materials are iron-chromium-aluminum alloys which can operate at temperatures slightly above 1,800° F. These alloys have excellent oxidation resistance but have decreased hot strength and tend to creep at elevated temperatures.

The inside surface of reflector 18 is coated with a material having high reflectivity. Gold, silver and aluminum are regarded as good reflector materials. Of the three, gold has the best oxidation resistance. When deposited in an extremely thin coating (approximately 0.000005 inch thick) a gold coating from a low-cost, high-efficiency reflector.

A pair of movable reflectors 28 and 30 are mounted along opposite sides of opening 22 by hinges 32 and 34 and have gold-plated reflecting surfaces 36 and 38 respectively. Projecting tabs 40 are accessible from the interior 12 of the automobile for positioning the reflectors 28, 30 in a desired position.

When electric current is passed through resistance wire element 24, infrared energy or radiation is emitted as illustrated by lines 44 in FIG. 3. When the radiation strikes the reflector 18, it converges toward opening 22 and is focused at 46. Subsequently the radiation diverges from the focus 46 into the interior 12 of the automobile through opening 22. Thus, element 24 and reflector 18 produce a narrow focal plane of infrared energy through opening 22.

Reflectors 28 and 30 are manually pivoted about hinges 32 and 34 to redirect the radiation to alternate portions of interior 12. For example, by pivoting reflector 28 clockwise in FIG. 3 infrared energy is directed to the lower portion of interior 12. By pivoting reflector 30 counterclockwise, infrared energy is directed to the upper portion of interior 12. Pivotal movement of both reflectors 28, 30 contracts the plane of infrared heat energy emitted from opening 22 and concentrates the radiation into a smaller area.

Figure 4:
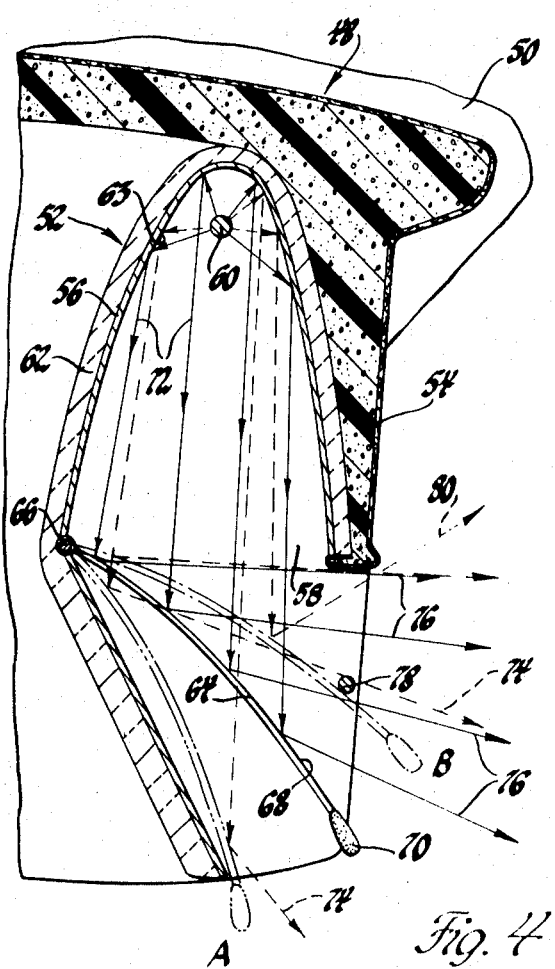
FIG. 4 is a side view in section of an automobile dashboard showing another embodiment of the present invention.

In FIG. 4, a sectional view of a dashboard 48 is shown within the interior 50 of an automobile. An infrared heater 52 is positioned behind a front 54 of dashboard 48. Heater 52 includes an elongated, generally parabolic reflector 56 having its curved end directed upward. An open end 58 of reflector 56 exposes the interior 50 of the automobile to radiation.

An electric resistance wire element 60 extends along the focal line of the elongated reflector 56. When electric current passes through element 60, considerable heat is generated in the form of infrared radiation. Insulation 62 on the outer surface of reflector 56 prevents the escape of heat except through opening 58.

Element 60 can be made of either the nickel-chromium alloy or the iron-chromium-aluminum alloy previously stipulated. A thin reflective coating of gold is deposited on the inner surface of the reflector 56 to form a good parabolic reflecting surface 63.

A movable reflector 64 is mounted adjacent one side of opening 58 by a hinge 66 for pivotal movement. Reflector 64 is curved with a convex surface directed toward element 60 and is gold coated to form a highly reflective convex surface 68. A knob 70 on the free end of the reflector 64 is adapted to pivot the reflector 64 between position A and position B in FIG. 4.

Infrared radiation 72 from element 60 is gathered by reflector 56 into a beam and falls upon surface 68 of reflector 64 which directs and scatters the beam into interior 50. When reflector 64 is in position A in FIG. 4, radiation is directed to the lower portion of interior 50 as illustrated by dotted lines 74. When reflector 64 is pivoted counterclockwise to its mid position shown by the solid lines the radiation is directed substantially straight out into interior 50 of the automobile as shown by lines 76. When reflector 64 is pivoted to position B, a stop 78 prevents further counterclockwise rotation. In position B the radiation is directed toward the upper part of interior 50 as shown by line 80.

While the embodiments of the present invention as herein described constitute preferred forms, it is to be understood that other forms may be adapted.

What is claimed is as follows:

1. An auxiliary infrared heating system for warming the passenger compartment of an automobile having a dashboard with a front surface comprising: an elongated infrared heating element extending across said automobile behind said dashboard front surface; an elongated reflector extending across said automobile parallel to said heating element and curved around said heating element to form an elongated opening through which infrared radiation emitted from said heating element and reflected by said reflector passes; said front surface of the dashboard having an elongated opening therethrough aligned with said elongated reflector opening for the transmission of infrared radiation into the passenger compartment; pivotal reflecting means between said openings for selectively redirecting infrared radiation in an upward and downward direction into said passenger compartment.

2. An auxiliary infrared heating system for warming the passenger compartment of an automobile having a dashboard with a front surface comprising; an elongated infrared heating element extending across said automobile behind said dashboard front surface; an elongated reflector extending across said automobile parallel to said heating element and curved around said heating element to form an elongated opening through which infrared radiation emitted from said heating element and reflected by said reflector passes; said front surface of the dashboard having an elongated opening therethrough aligned with said elongated reflector opening for the transmission of infrared radiation into the passenger compartment; said elongated reflector being formed around said infrared heater to focus infrared radiation along a line adjacent said reflector opening and thereby causing infrared radiation to diverge into said passenger compartment through said dashboard opening; first and second pivotal reflecting surfaces hinged along the opening in said elongated reflector and extending through said opening in said dashboard whereby pivotal movement of said first and second reflecting surfaces selectively redirects infrared radiation upward and downward into said passenger compartment.

3. An auxiliary infrared heating system for warming the passenger compartment of an automobile having a dashboard with a front surface comprising: an elongated infrared heating element extending across said automobile behind said dashboard front surface; an elongated reflector extending across said automobile parallel to said heating element and curved around said heating element to form an elongated opening through which infrared radiation emitted from said heating element and reflected by said elongated reflector passes in a first direction; said front of the dashboard defining an elongated opening for the transmission of infrared radiation into the passenger compartment; a movable reflector pivotally mounted between said openings for redirecting infrared radiation into the passenger compartment; said movable reflector having a concave reflecting surface with respect to said infrared heating element to cause said infrared radiation to diverge as it is reflected into said passenger compartment.

* * * * *